(12) United States Patent
Kitterer et al.

(10) Patent No.: US 7,259,661 B2
(45) Date of Patent: Aug. 21, 2007

(54) COLLISION WARNING SYSTEM AND METHOD FOR A MOTOR VEHICLE

(75) Inventors: Hartmut Kitterer, Hannover (DE); Frank Zielke, Barsinghausen (DE); Karsten Breuer, Lauenau (DE); Dirk Sandkühler, Werne (DE)

(73) Assignee: WABCO GmbH & Co. OHG, Hannover (DE)

( * ) Notice: Subject to any disclaimer, the term of this patent is extended or adjusted under 35 U.S.C. 154(b) by 203 days.

(21) Appl. No.: 11/042,382

(22) Filed: Jan. 24, 2005

(65) Prior Publication Data

US 2005/0168328 A1    Aug. 4, 2005

(30) Foreign Application Priority Data

Jan. 31, 2004    (DE)    ............ 10 2004 004 918

(51) Int. Cl.
*B60Q 1/00*    (2006.01)
(52) U.S. Cl. .............. 340/436; 340/435; 340/438; 340/439; 340/903; 701/301; 701/70; 342/70; 342/71
(58) Field of Classification Search ........ 340/435, 340/436, 438, 439, 903, 961; 701/48, 70, 701/71, 301; 342/29, 41, 70, 71
See application file for complete search history.

(56) References Cited

U.S. PATENT DOCUMENTS

| | | | |
|---|---|---|---|
| 5,357,438 A * | 10/1994 | Davidian | ............ 701/301 |
| 5,459,460 A | 10/1995 | Nishino | |
| 5,684,473 A | 11/1997 | Hibino et al. | |
| 5,931,547 A | 8/1999 | Lerner | |
| 6,294,987 B1 | 9/2001 | Matsuda et al. | |
| 6,473,681 B1 | 10/2002 | Eckert et al. | |
| 6,604,042 B2 | 8/2003 | Maruko et al. | |

(Continued)

FOREIGN PATENT DOCUMENTS

DE    43 23 314 C2    6/1994

(Continued)

OTHER PUBLICATIONS

Intelligent Cruise Control With Fuzzy Logic, R. Muller, G. Nocker, Jun. 29-Jul. 1, 1992, Intelligent Vehicles '92 Symposium, IEEE, pp. 173-178.

*Primary Examiner*—Hung Nguyen
(74) *Attorney, Agent, or Firm*—Kramer Levin Naftalis & Frankel LLP

(57) ABSTRACT

A collision warning system and method for a motor vehicle. A measuring device in the vehicle is provided for measuring the distance dx to a second vehicle traveling ahead, the distance signal being delivered to an evaluation device in the first vehicle. The evaluation device continuously calculates a deceleration $a_{subject\ vehicle\ demand}$, which is applied by the vehicle after expiration of a driver reaction time $T_{reaction}$ in order that a remaining distance $dx_{remaining}$ to the second vehicle traveling ahead can be maintained. If $a_{subject\ vehicle\ demand}$ exceeds an instantaneous deceleration that can be achieved by an adaptive cruise control ("ACC") system, a system limit warning is transmitted, prompting the vehicle driver to brake with additional appropriate force. If $a_{subject\ vehicle\ demand}$ exceeds an assumed vehicle deceleration that can be generated by braking on the part of the driver, a collision warning signal is transmitted independently of the ACC system.

22 Claims, 1 Drawing Sheet

U.S. PATENT DOCUMENTS

| | | |
|---|---|---|
| 6,871,145 B2 * | 3/2005 | Altan et al. .................. 701/301 |
| 2003/0130783 A1 | 7/2003 | Hellmann et al. |
| 2005/0080565 A1 * | 4/2005 | Olney et al. |

FOREIGN PATENT DOCUMENTS

| | | |
|---|---|---|
| DE | 195 10 910 A1 | 9/1995 |
| DE | 198 17 326 A1 | 10/1999 |
| DE | 199 21 238 C2 | 11/1999 |
| DE | 100 15 299 A1 | 10/2001 |
| DE | 102 20 567 A1 | 11/2003 |
| EP | 0 484 995 A2 | 5/1992 |
| EP | 0 827 860 B1 | 3/1998 |
| JP | 06-298022 | 10/1994 |

* cited by examiner

COLLISION WARNING SYSTEM AND METHOD FOR A MOTOR VEHICLE

BACKGROUND OF THE INVENTION

The present invention is directed generally to a collision warning system and method for a motor vehicle.

Modern road vehicles, particularly commercial vehicles, are increasingly being equipped with cruise control systems which enable a vehicle so equipped to achieve and maintain a constant cruising speed, which can be preset by the driver. The preset speed is maintained even when the vehicle is ascending or descending an incline. For this purpose, such cruise control systems are capable of opening or closing the vehicle throttle, as appropriate, or of actuating the vehicle retarder.

Adaptive cruise control ("ACC") or distance control systems can also measure the distance between a vehicle so equipped and vehicles traveling ahead, and maintain that distance constant. For this purpose, a distance measuring sensor is employed which can be designed as a RADAR or LASER sensor, for example.

When the distance to the vehicle traveling ahead has decreased to a preset index distance, as recognized by the distance sensor, the ACC system readjusts the vehicle distance to the index value by throttling back or by additional actuation of the vehicle service brakes. For trucks, this predetermined distance is typically 50 meters. The vehicle speed may then be lower than the set cruising speed. If the vehicle traveling ahead accelerates beyond the index distance, the set cruising speed is restored. For safety and comfort reasons, the service brake is typically actuated by the ACC system only up to a vehicle deceleration of approximately 2.5 m/s$^2$, which is well below the maximum deceleration of 6 to 8 m/s$^2$.

A critical condition for an ACC system exists when the vehicle traveling ahead brakes suddenly and heavily, or when a vehicle from a neighboring lane moves in front of the vehicle using the ACC system closer than a safe distance. A known method of preventing accidents in such situations is to generate a suitable warning ("system limit warning") to the driver. Thus, if the braking function of the ACC system is not sufficient, the driver can assist by additional braking in order to maintain a safe distance to the vehicle traveling ahead.

Regardless of whether an ACC system is being used, however, the driver can also be warned if the danger of a rear-end collision is recognized ("collision warning").

U.S. Pat. No. 5,931,547 describes a vehicle anti-collision system that generates an audible warning for the driver when a time-to-collision ("TTC") with an object (such as a second vehicle) ahead of the subject vehicle is shorter than a predetermined warning time. In this case, the hydraulic braking system of the subject vehicle is automatically actuated. The distance to the object ahead is determined with a LASER ranging instrument. Automatic braking takes place only if any brake pressure already being applied in the subject vehicle by the driver is smaller than a fixed threshold. That is, automatic braking takes place only when the driver is not braking with enough force.

According to the system described in U.S. Pat. No. 5,931,547, the TTC can be calculated according to the following formula:

$$TTC = \frac{\text{Distance}}{\Delta v}$$

where:

$\Delta v$ represents the difference between the speeds of the subject vehicle and the object (second vehicle).

A warning is transmitted as soon as the TTC becomes shorter than a threshold value.

The system described in U.S. Pat. No. 5,931,547 has the disadvantage, however, that the practical calculation yields a very long TTC, especially at short distances and at a relative speed close to zero. As a result, the situation in these cases is evaluated as non-hazardous by the ACC system, since the TTC is still above the threshold value, even though a hazardous situation actually exists because of the short distance. In addition, the calculation according to the foregoing formula must also be regarded as impractical in highly dynamic driving situations, in which the distance and relative speeds of the vehicles are constantly undergoing rapid changes.

European Patent 0827860 B1 describes a method for adaptive cruise control of a vehicle, as well as a device for implementing the method, wherein a warning is transmitted to the driver if the distance between the subject vehicle and a vehicle traveling ahead becomes shorter than an index value. This index value depends on the driving speed of the subject vehicle, on the weather conditions and on the driving style of the driver. By means of the warning signal, the driver is prompted to brake the subject vehicle manually in addition to the braking applied by the ACC system. The driving response of the driver and driving style are determined from the driver's acceleration and braking actions up to that time.

U.S. Pat. No. 6,604,042 describes a vehicle braking control system in which automatic braking can be initiated when the subject vehicle approaches an object (second vehicle) located ahead. The system described in U.S. Pat. No. 6,604,042 additionally recognizes whether the driver intends to overtake the vehicle traveling ahead. In this case, the automatic braking that would be initiated before any braking by the driver is prevented. A target deceleration is calculated for the subject vehicle that would be necessary to avoid a collision with the vehicle traveling ahead. The calculated target deceleration is then compared against a deceleration threshold of the subject vehicle in a comparator stage. Automatic braking of the subject vehicle is then initiated when, among other circumstances, the calculated target deceleration is greater than or equal to a preset threshold value and further conditions are simultaneously satisfied.

The system described in U.S. Pat. No. 6,604,042 does not provide for possible additional braking by the driver and also does not allow for the driver's reaction time. Nor is a necessary remaining distance to the vehicle traveling ahead taken into consideration. Furthermore, no collision warning signal independent of the control action is generated for the driver.

Accordingly, it is desired to provide an improved collision warning system and method for a motor vehicle that avoids the foregoing disadvantages and that are capable of generating a reliable warning signal for the driver if it is anticipated that a remaining distance to a vehicle traveling ahead cannot be maintained at the end of ACC system braking or after braking by the driver.

SUMMARY OF THE INVENTION

Generally speaking, in accordance with the present invention, an improved collision warning system and method for a motor vehicle are provided which improve over prior art systems and methods.

The collision warning method according to one embodiment of the present invention involves repetitively calculating a deceleration rate for the vehicle sufficient to maintain a preselected distance between the vehicle and a second vehicle traveling ahead when the vehicle is decelerated subsequent to expiration of a braking reaction time of the driver of the vehicle. This is accomplished in a vehicle system including a control unit programmed with a suitable algorithm (software) for determining when a collision warning is indicated.

The deceleration rate calculation is based at least in part on the relative speed of the vehicle and the second vehicle, the distance between the vehicle and the second vehicle measured using a suitable distance measuring device provided in the vehicle, the deceleration rate for the second vehicle and the preselected distance.

The calculated deceleration rate for the vehicle is repetitively compared against the deceleration rate associated with vehicle braking initiated by the vehicle driver. A collision warning signal is generated when the calculated deceleration rate for the vehicle exceeds the deceleration rate associated with vehicle braking initiated by the driver.

When the vehicle includes an ACC system, the inventive method further involves repetitively comparing the calculated deceleration rate for the vehicle against the vehicle deceleration rate that can be achieved by the ACC system. A system limit warning is generated when the calculated vehicle deceleration rate exceeds the vehicle deceleration rate that can be achieved by the ACC system.

The system and method according to the present invention advantageously allow for the driver's reaction time to the generated warning signal. This reaction time is taken into consideration even when the driver is already braking. In this case, the driver's reaction time, that is, the time from normal braking to the required heavier or maximum braking, is shorter than the reaction time from no braking to braking since, in the first case, the driver's foot is already on the brake pedal.

A further advantage of the inventive system and method is that the calculations provided are physically correct and can therefore be used in every situation. Thus, the danger of a false alarm is reduced. All formulae are of sufficiently simple mathematical construction that they can be processed without problem even in the case of the limited computing power of microcontrollers with fixed-point arithmetic.

Still other objects and advantages of the invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
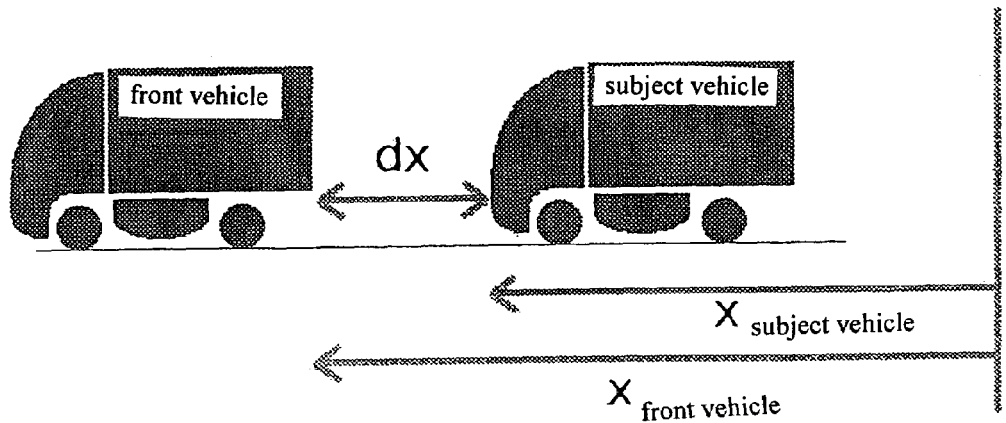
FIG. 1 is a schematic diagram of two vehicles traveling one behind the other, the second ("subject") vehicle having the capability of effecting the collision warning method according to the present invention.

Referring to the drawing figures, FIG. 1 depicts a vehicle labeled "subject vehicle" and a vehicle labeled "front vehicle" traveling ahead of it. The "subject vehicle" is provided with the collision warning functionality according to the present invention.

The distance between the two vehicles at any given time is denoted by dx. The longitudinal coordinates of the two vehicles relative to an imaginary zero line are $x_{subject\ vehicle}$ and $x_{front}$. By definition, $x_{front} - x_{subject\ vehicle} = dx$.

The possibility of transmitting a collision warning exists in principle for vehicles equipped with a forward looking sensor for checking the surroundings (such as the distance sensor of an ACC system). Such a warning can be audible, visual or tactile.

By means of the sensor, such as, for example, a RADAR sensor, the distance and/or speed relative to the vehicle traveling ahead can be established. The speed and acceleration or deceleration of the subject vehicle can be determined in known manner by wheel sensors. Thus, by means of the distance or relative speed established as discussed above, the speed and acceleration or deceleration of the vehicle traveling ahead can also be determined. The data are used in the derivation of a collision warning as explained in greater detail hereinafter.

In order to achieve a collision warning, there is employed not only the sensor system for checking the surroundings but also a control unit programmed with a suitable algorithm (software) for calculating whether or not a collision warning is necessary in a given traffic situation.

Generally speaking, a critical traffic situation can occur when a slower object suddenly moves in front of the subject vehicle, or if a vehicle traveling ahead suddenly decelerates (or if both occur simultaneously).

In formulating collision warning criteria, knowledge about how the vehicle decelerates during the use of the ACC system or during action by the driver is helpful in addition to knowledge concerning the driver's reaction time. It can be assumed that the driver will be able to decelerate the vehicle at approximately 6 to 8 m/s² by manual braking, whereas driver assistance systems available on the European market, for example, typically apply a deceleration of only up to 2.5 m/s² for longitudinal vehicle guidance. This relatively small deceleration for driver assistance systems is dictated by safety considerations—e.g., to avoid rear-end collisions and the possibility that a malfunctioning ACC system transmits an erroneous command to apply full braking.

As described hereinafter, a collision warning criterion is derived, specifically in the form of a formula for a vehicle deceleration $a_{subject\ vehicle\ demand}$ for the subject vehicle, which criterion is applied to a warning signal of the ACC system of the vehicle after expiration of a driver reaction time $T_{reaction}$, in order that a remaining distance $dx_{remaining}$ to the vehicle traveling ahead can be maintained.

If the calculated deceleration $a_{subject\ vehicle\ demand}$ exceeds a deceleration that can be achieved by an ACC system, as can be recognized by a comparison, a system limit warning is transmitted, prompting the driver to assist the ACC system by additional braking. If the calculated deceleration $a_{subject\ vehicle\ demand}$ exceeds an assumed maximum deceleration that can be generated by the driver, a general collision warning is generated independently of the ACC system.

Figure 2:
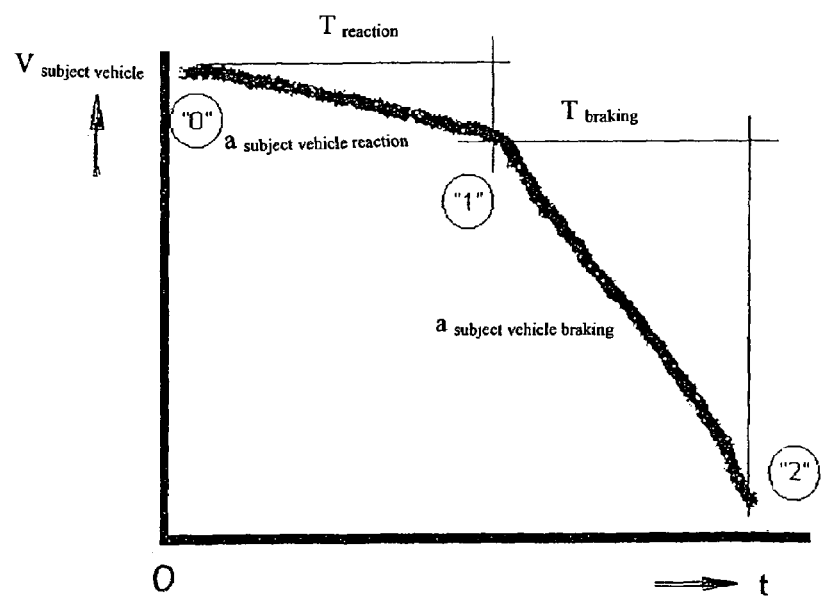
FIG. 2 is a graphical representation of vehicle braking illustrating the derivation of a formula used in the collision warning method according to the present invention for application of vehicle deceleration.

The collision warning criterion, or, in other words, the calculated required deceleration $a_{subject\ vehicle\ demand}$, is based, according to FIG. 2, on the assumption that the driver has a reaction time $T_{reaction}$ and is capable, after this reaction time has expired, of decelerating the vehicle with a deceleration $a_{subject\ vehicle\ braking}$, for example by full braking. The reaction time $T_{reaction}$ is an adjustable parameter of the criterion, and is situation-dependent. For example, the reaction time can be assumed to be shorter when the driver has already recognized a hazardous situation and therefore already has his/her foot on the brake pedal.

It is assumed that the acceleration $a_{front}$ of the front vehicle remains constant during any given calculation cycle. The calculation is repeated, for example every 50 ms.

During each time scan of the collision warning algorithm, the derived collision warning criterion continuously extrapolates the future motion conditions of the subject vehicle and of the vehicle traveling ahead on the basis of the instantaneous motion conditions, and in this way calculates a deceleration $a_{subject\ vehicle\ demand}$ that is applied after expiration of the foregoing reaction time $T_{reaction}$ in order to prevent collision with the leading vehicle, or, in other words, to maintain a remaining distance $dx_{remaining}$.

If the value calculated in this way for $a_{subject\ vehicle\ demand}$ still exceeds the vehicle deceleration that can be applied by the driver under normal conditions, a general collision warning is generated for the driver by the ACC system in addition to the system limit warning discussed above.

The calculations which follow represent the detailed basis for the collision warning criterion.

During each time scan or cycle, the criterion is recalculated. The instant ("0") corresponds to the time origin of the graph depicted in FIG. 2.

It is assumed that the subject vehicle will maintain the current deceleration until expiration of the reaction time $T_{reaction}$ (instant "1"). At the end of the reaction time, the motion condition of the subject vehicle and of the leading vehicle can be calculated as set forth below.

General relationships according to FIG. 1:

Distance: $dx = x_{front} - x_{subject\ vehicle}$

Relative speed: $dv = v_{front} - v_{subject\ vehicle}$

First, the general equations of the relative motion of the two vehicles as a function of time (t) are constructed. The ensuing calculation of distance $dx(t)$ and relative speed $dv(t)$ is valid during the reaction time ($0 < t < T_{reaction}$), or in other words between instants "0" and "1" of FIG. 2:

$dx(t) = dx_0 + (v_{front\ 0} - v_{subject\ vehicle\ 0}) \cdot t + \frac{1}{2} \cdot (a_{front\ 0} - a_{subject\ vehicle\ reaction}) \cdot t^2$ $dv(t) = (v_{front\ 0} - v_{subject\ vehicle\ 0}) + (a_{front\ 0} - a_{subject\ vehicle\ reaction}) \cdot t$ where:
$dx_0$ = distance at instant zero
$v_0$ = speeds at instant zero
$a_{front\ 0}$ = deceleration of front vehicle at instant zero
$a_{subject\ vehicle\ reaction}$ = (constant) deceleration of the subject vehicle between instants "0" and "1".

When the substitution $t = T_{reaction}$ is made as a special case of the above formula, the preliminary calculation relates to the end of the reaction time (instant "1"), where it yields:

i $dx_1 = dx_0 + (v_{front\ 0} - v_{subject\ vehicle\ 0}) \cdot T_{reaction} + \frac{1}{2} \cdot (a_{front\ 0} - a_{subject\ vehicle\ reaction}) \cdot T^2_{reaction}$ $dv_1 = (v_{front\ 0} - v_{subject\ vehicle\ 0}) + (a_{front\ 0} - a_{subject\ vehicle\ reaction}) \cdot T_{reaction}$ After expiration of reaction time $T_{reaction}$, there is calculated that deceleration $a_{subject\ vehicle\ demand}$ of the subject vehicle which is sufficient to prevent a collision with the leading vehicle and to guarantee a small remaining distance $dx_{remaining}$ (such as, for example, 5 meters).

For the following time period, there are constructed the general formulae for the vehicle motion, or, in other words, for the distance $dx(t)$ and for the differential speed $dv(t)$, specifically for ($T_{reaction} < t < T_{braking}$), or in other words for the time period between "1" and "2" in FIG. 2:

$dx(t) = dx_1 + (dv_1) \cdot t + \frac{1}{2} \cdot (a_{front\ 0} - a_{subject\ vehicle\ demand}) \cdot t^2$ $dv(t) = (dv_1) + (a_{front\ 0} - a_{subject\ vehicle\ demand}) \cdot t$ where:
$dx_1$, $dv_1$ = distance and relative speed at instant "1"
$a_{subject\ vehicle\ demand}$ = (constant) deceleration of the subject vehicle between instants "1" and "2".

When the substitution $t = T_{braking}$ is made, the preliminary calculation relates to the time at the end of the braking maneuver (instant "2"), where it yields:

$$dx_{T\_braking} = dx(t = T_{braking})$$
$$= dx_1 + (dv_1) \cdot T_{braking} + \frac{1}{2} \cdot (a_{front\_0} - a_{subject\ vehicle\ demand}) \cdot T^2_{braking}$$
$$dv_{T\_braking} = dv(t = T_{braking})$$
$$= (dv_1) + (a_{front\_0} - a_{subject\ vehicle\ demand}) \cdot T_{braking}$$

Additional information is now introduced into the preliminary calculation to the effect that, when the remaining distance (instant "2") is reached, the remaining distance $dx(t)$ between the two vehicles is $dx_{remaining}$ and the relative speed $dv(t)$ is completely eliminated or, in other words, zero. Thus:

$dx_{T\_braking} = dx(t = T_{braking}) = dx_{remaining}$ $dv_{T\_braking} = dv(t = T_{braking}) = 0$ Solving the equation $dv(t = T_{braking}) = 0$ for $T_{braking}$ and introducing the result into the equation of $dx(t = T_{braking})$ leads to the following relationship:

$$a_{subject\ vehicle\ demand} = -\frac{dv_1^2}{2 \cdot (dx_1 - dx_{remaining})} + a_{front\_0}$$

All terms of this equation are known. The values at instant "1", or in other words $dx_1$ and $dv_1$, were already calculated as indicated above. The indicated equation therefore directly yields the necessary deceleration of the subject vehicle (or acceleration, as the case may be) necessary to prevent a collision and resulting from the current kinematic situation after expiration of a system-specific or driver-specific reaction time.

The value $dx_{remaining}$, or in other words the remaining distance to the vehicle traveling ahead at the end of braking, is expediently set to a value of between 0 and 30 m.

To generate a system limit warning and a collision warning, two different cases are calculated simultaneously with the above formula for $a_{subject\ vehicle\ demand}$.

For a system limit warning, the reaction time $T_{reaction}$ is assumed for this purpose to be zero and $a_{subject\ vehicle\ demand}(T_{reaction})$ is calculated. The value calculated in this way is then compared, as mentioned above, with a predetermined deceleration that the ACC system can generate automatically. If heavier braking than can be achieved by the ACC system is necessary to achieve the demand deceleration $a_{subject\ vehicle\ demand}(T_{reaction})$, a system limit warning is transmitted to prompt the driver to brake with appropriately greater force.

For a collision warning, the formula presented above for $a_{subject\ vehicle\ demand}$ is calculated with a non-zero reaction time $T_{reaction}$ (or, in other words, with a realistic driver reaction time). $T_{reaction}$ is expediently set to a value of between 0.5 and 3 sec. if the driver has not yet actuated the brake at the calculation instant. However, the calculation is also valid for the case where the driver is already actively braking at the calculation instant. The actual deceleration between the points "0" and "1" (according to FIG. 2) can then also be used (approximately) as $a_{subject\ vehicle\ reaction}$. In this case, however, it can be assumed that the reaction time $T_{reaction}$ will be shorter than in the normal case, because the object has already been fixed and the driver has identified the situation. A shortened reaction time also results from the fact that the driver already has his/her foot on the brake pedal in this case. $T_{reaction}$ is therefore expediently set to a value of between 0.1 and 2 sec.

If greater deceleration of the vehicle than can be applied by the driver at the assumed maximum braking capacity is needed to achieve the value $a_{subject\ vehicle\ reaction}(T_{reaction}>0)$ calculated in this way, a collision warning is transmitted—regardless of whether or not the ACC system is being used. If the driver exerts his/her assumed maximum deceleration of the vehicle at the warning instant, the actual remaining distance falls within the distance $dx_{remaining}$ above. If evasion is still possible, the driver can simultaneously also prepare to drive around the vehicle traveling in front or around the obstacle in order to avoid a collision.

The collision warning criterion cannot be used correctly if the leading vehicle is faster than the subject vehicle. In this case, however, it should be appreciated that there would be no fear of a collision due to changes in speed, provided the distances are not too short.

If the leading vehicle comes to a stop during the calculation period, the calculation is appropriately expanded in order to prevent errors. For this purpose, the time interval until the stopped condition is reached is calculated with the current motion condition of the leading vehicle (acceleration and speed). Beginning from that instant, calculation of the distance remaining between the vehicles and of the relative speed is based only on the motion of the subject vehicle. However, since the results of the less involved algorithm as described above result in an earlier warning to the driver, the expansion of the calculation can be disregarded under certain circumstances in order to optimize the computing time on a microcontroller.

The collision warning and/or system limit warning according to the present invention can also be used expediently in simultaneous manner to initiate an automatic braking operation with the service brake of the vehicle. This has the advantage that braking takes place particularly rapidly in general, since the reaction time of the driver is eliminated. Moreover, braking also takes place with the necessary high intensity. Of course, the prerequisite for such automatic braking is that the vehicle be equipped with an ACC system and with an electronically activatable brake system. By means of such systems, the service brake can be activated independently of the driver.

As indicated above, the deceleration applied by such automatic braking is expediently limited to a value well below the maximum possible deceleration. The purpose is to prevent rear-end collisions caused by the following vehicle, especially resulting from a possible false alarm. Thus, the decision as to maximum braking remains reserved to the driver.

The system limit warning and/or the collision warning can expediently be delivered by audible and/or visual and/or tactile signals.

All formulae of both the simple and expanded criteria can be processed even with limited computing power in microcontrollers with fixed-point arithmetic (no extraction of roots, no solving of systems of equations). Thereby, the inventive method can be implemented at favorable costs and in certain cases can even be additionally programmed into microcontrollers already present in the vehicle.

Accordingly, the present invention provides an improved collision warning system and method for a motor vehicle that are capable of generating a reliable warning signal for the driver if it is anticipated that a remaining distance to the vehicle traveling ahead cannot be maintained at the end of ACC braking or after braking by the driver.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A collision warning method for a vehicle, the vehicle having a device for measuring the distance from the vehicle to a second vehicle traveling ahead and a control unit programmed to generate a warning when a danger of collision of the vehicle and the second vehicle is determined, the method comprising the steps of:

repetitively calculating in the control unit a deceleration rate for the vehicle sufficient to maintain a preselected distance between the vehicle and the second vehicle when the vehicle is decelerated subsequent to expiration of a braking reaction time of the driver of the vehicle, the calculation being based at least in part on a relative speed of the vehicle and the second vehicle, the distance between the vehicle and the second vehicle, a deceleration rate for the second vehicle and the preselected distance;

repetitively comparing the calculated deceleration rate for the vehicle against a deceleration rate associated with vehicle braking initiated by the driver of the vehicle; and generating a collision warning signal when the calculated deceleration rate for the vehicle exceeds the deceleration rate associated with vehicle braking initiated by the driver of the vehicle;

wherein the deceleration rate for the vehicle "$a_{subject\ vehicle\ demand}$" is calculated according to:

$$a_{subject\ vehicle\ demand} = -\frac{dv_1^2}{2 \cdot (dx_1 - dx_{remaining})} + a_{front\_0}$$

where:
- $dv_1$ = the relative speed of the vehicle and the second vehicle at the expiration of the braking reaction time of the driver of the vehicle,
- $dx_1$ = the distance between the vehicle and the second vehicle at the expiration of the braking reaction time of the driver of the vehicle,
- $dx_{remaining}$ = the preselected distance between the vehicle and the second vehicle at the end of deceleration of the vehicle, and
- $a_{front\_o}$ = the deceleration rate for the second vehicle.

2. The method according to claim 1, wherein the vehicle includes an adaptive cruise control system, and further comprising the steps of repetitively comparing the calculated deceleration rate for the vehicle against a vehicle deceleration rate that can be achieved by the adaptive cruise control system, and generating a system limit warning when the calculated vehicle deceleration rate exceeds the vehicle deceleration rate that can be achieved by the adaptive cruise control system.

3. The method according to claim 2, further comprising the step of automatically initiating braking of the vehicle when the system limit warning is generated.

4. The method according to claim 3, wherein vehicle deceleration resulting from the automatically initiated braking is limited to a rate less than the maximum possible deceleration of the vehicle.

5. The method according to claim 2, wherein the system limit warning is at least one of an audible and visual and tactile signal.

6. The method according to claim 1, wherein the preselected distance is 0-30 meters.

7. The method according to claim 1, wherein the braking reaction time of the driver of the vehicle when the driver is not initiating braking of the vehicle is 0.5-3.0 seconds.

8. The method according to claim 1, wherein the braking reaction time of the driver of the vehicle when the driver is initiating braking of the vehicle is 0.1-2.0 seconds.

9. The method according to claim 1, further comprising the step of automatically initiating braking of the vehicle when the collision warning is generated.

10. The method according to claim 9, wherein vehicle deceleration resulting from the automatically initiated braking is limited to a rate less than the maximum possible deceleration of the vehicle.

11. The method according to claim 1, wherein the collision warning is at least one of an audible and visual and tactile signal.

12. A system for warning the driver of a vehicle of an impending collision with a second vehicle traveling ahead, the system comprising:
- means for measuring a distance from the vehicle to the second vehicle traveling ahead;
- a control unit;
- means associated with the control unit for repetitively calculating a deceleration rate for the vehicle sufficient to maintain a preselected distance between the vehicle and the second vehicle when the vehicle is decelerated subsequent to expiration of a braking reaction time of the driver of the vehicle, the calculation being based at least in part on a relative speed of the vehicle and the second vehicle, the distance between the vehicle and the second vehicle, a deceleration rate for the second vehicle and the preselected distance;
- means for repetitively comparing the calculated deceleration rate for the vehicle against a deceleration rate associated with vehicle braking initiated by the driver of the vehicle; and
- means for generating a collision warning signal when the calculated deceleration rate for the vehicle exceeds the deceleration rate associated with vehicle braking initiated by the driver of the vehicle;

wherein the means for calculating the deceleration rate for the vehicle "$a_{subject\ vehicle\ demand}$" effects the formula:

$$a_{subject\ vehicle\ demand} = -\frac{dv_1^2}{2 \cdot (dx_1 - dx_{remaining})} + a_{front\_0}$$

where:
- $dv_1$ = the relative speed of the vehicle and the second vehicle at the expiration of the braking reaction time of the driver of the vehicle,
- $dx_1$ = the distance between the vehicle and the second vehicle at the expiration of the braking reaction time of the driver of the vehicle,
- $dx_{remaining}$ = the preselected distance between the vehicle and the second vehicle at the end of deceleration of the vehicle, and
- $a_{front\_o}$ = the deceleration rate for the second vehicle.

13. The system according to claim 12, further comprising an adaptive cruise control system, means for repetitively comparing the calculated deceleration rate for the vehicle against a vehicle deceleration rate that can be achieved by the adaptive cruise control system, and means for generating a system limit warning when the calculated vehicle deceleration rate exceeds the vehicle deceleration rate that can be achieved by the adaptive cruise control system.

14. The system according to claim 13, further comprising means for automatically initiating braking of the vehicle when the system limit warning is generated.

15. The system according to claim 14, wherein vehicle deceleration resulting from the automatically initiated braking is limited to a rate less than the maximum possible deceleration of the vehicle.

16. The system according to claim 13, wherein the system limit warning is at least one of an audible and visual and tactile signal.

17. The system according to claim 12, wherein the preselected distance is 0-30 meters.

18. The system according to claim 12, wherein the braking reaction time of the driver of the vehicle when the driver is not initiating braking of the vehicle is 0.5-3.0 seconds.

19. The system according to claim 12, wherein the braking reaction time of the driver of the vehicle when the driver is initiating braking of the vehicle is 0.1-2.0 seconds.

20. The system according to claim 12, further comprising means for automatically initiating braking of the vehicle when the collision warning is generated.

21. The system according to claim 20, wherein vehicle deceleration resulting from the automatically initiated braking is limited to a rate less than the maximum possible deceleration of the vehicle.

22. The system according to claim 12, wherein the collision warning is at least one of an audible and visual and tactile signal.

* * * * *